United States Patent
Beutin et al.

(10) Patent No.: US 7,533,517 B2
(45) Date of Patent: May 19, 2009

(54) EXHAUST NOZZLE FOR AN ENGINE OF A FLYING CRAFT

(75) Inventors: Bruno Albert Beutin, Evry (FR); Jeremy Edmond Fert, Paris (FR)

(73) Assignee: SNECMA, Paris (FR)

( * ) Notice: Subject to any disclaimer, the term of this patent is extended or adjusted under 35 U.S.C. 154(b) by 470 days.

(21) Appl. No.: 11/402,952

(22) Filed: Apr. 13, 2006

(65) Prior Publication Data
US 2006/0230744 A1    Oct. 19, 2006

(30) Foreign Application Priority Data
Apr. 14, 2005    (FR)    ................... 05 03716

(51) Int. Cl.
*F02K 1/28*    (2006.01)
(52) U.S. Cl. .................... 60/231; 239/265.23
(58) Field of Classification Search .................. 60/228, 60/231, 263, 269, 770; 137/834, 838; 239/265.17, 239/265.23; 244/52
See application file for complete search history.

(56) References Cited

U.S. PATENT DOCUMENTS

| 3,239,150 A | * | 3/1966 | Chisel | ................... 239/265.23 |
| 3,273,801 A | * | 9/1966 | Wilhite | ................... 239/265.23 |
| 3,486,517 A | * | 12/1969 | Gaura | ........................ 137/832 |
| 6,679,048 B1 | | 1/2004 | Lee et al. | |

FOREIGN PATENT DOCUMENTS

FR    1.456.926    7/1966
GB    744196    2/1956

* cited by examiner

*Primary Examiner*—Louis J Casaregola
(74) *Attorney, Agent, or Firm*—Oblon, Spivak, McClelland, Maier & Neustadt, P.C.

(57) ABSTRACT

Exhaust nozzle 14 for an engine of a flying craft, comprising a tubular body with two outlet ducts 16, 18 and boxes 26, 28 for injecting gas into the outlet ducts for the purpose of thrust vectoring, these boxes having windows 38 aligned with slots 39 formed in the outlet ducts, and controlled means for adjusting the outflow of gas injected into the outlet ducts.

12 Claims, 3 Drawing Sheets

EXHAUST NOZZLE FOR AN ENGINE OF A FLYING CRAFT

FIELD OF THE INVENTION

The present invention relates to an exhaust nozzle for an engine of a flying craft, this nozzle being of the "bifurcated" type and comprising a tubular body with two outlet ducts defining, in the upstream direction, a primary gas flow path divided, in the downstream direction, into two parallel secondary gas flow paths.

BACKGROUND OF THE INVENTION

A nozzle of this type makes it possible to mask the infrared signal emitted by the engine and reduces the risks of the flying craft being detected by infrared sensors.

A flying craft is generally controlled in yaw by means of movable rudders whose movements can be detected by a radar. To reduce the risk of radar detection for the flying craft, it has already been proposed to do away with the rudders and equip the nozzle with air injection pipes which are mounted on the outside of the nozzle and open into the latter so as to deflect the stream of gas passing through the nozzle by means of a flow of air injected transversely or obliquely into this gas stream.

However, these known means are not adapted to a "bifurcated" nozzle of the aforementioned type.

The invention particularly aims to provide a simple, efficient and economic solution to this problem and relates to a "bifurcated" exhaust nozzle which enables the flight performance and the piloting accuracy of the flying craft equipped with this nozzle to be improved while at the same time efficiently reducing the risks of radar and infrared detection.

SUMMARY OF THE INVENTION

To this end, the invention proposes an exhaust nozzle for an engine of a flying craft, comprising a tubular body with two outlet ducts defining, in the upstream direction, a primary gas flow path divided, in the downstream direction, into two parallel secondary gas flow paths, characterized in that the outlet ducts comprise thrust vectoring means consisting of boxes for injecting gas into the aforementioned secondary paths, these boxes being attached to lateral walls of the outlet ducts in an intermediate space formed between the downstream sections of these outlet ducts and each having a window aligned with a slot formed in the aforementioned wall of the corresponding outlet duct, and controlled means for adjusting the outflow of gas injected through the said window into the secondary path.

The injection boxes are thus mounted between the outlet ducts for the purpose of injecting pressurized gas into the secondary paths in outward directions with respect to the axis of the engine. Injecting gas via one box into a secondary path makes it possible to deflect the thrust to the left, and injecting gas via the other box into the other secondary path makes it possible to deflect the thrust to the right.

The gas injection boxes are, for example, supplied with pressurized gas from an annular manifold installed around the confluence of the engine.

In a simple manner, the controlled adjusting means comprise, in each box, a flap pivotally mounted inside the box between a position in which it closes off the window and a position in which it opens the latter, this flap being connected to actuating means, such as a ram for example, which are situated outside the box.

The adjustable closure of the window makes it possible to adjust the outflow of gas injected into the secondary path.

The flap is, for example, pivotally mounted along an edge of the window by means of a pin having one end outside the box connected to the aforementioned actuating means and the other end guided in a bearing mounted in the box.

When the window is in the closed-off position, the flap preferably provides a continuity of the inner surface of the outlet duct so as not to disturb the flow of gas in this duct.

Seals may be mounted around the window between the box and the wall of the outlet duct and on the pivot pin of the flap.

In a preferred embodiment of the invention, the boxes for injecting gas into the outlet ducts are each supplied with pressurized gas via a pipe opening into the box in a direction substantially perpendicular to the axis of the engine and to the yaw axis of the flying craft and directed outwardly with respect to the axis of the engine.

BRIEF DESCRIPTION OF THE DRAWINGS

Other details, characteristics and advantages of the present invention will become apparent on reading the description below given by way of non-limiting example with reference to the appended drawings, in which.

DESCRIPTION OF PREFERRED EMBODIMENTS

Figure 1:
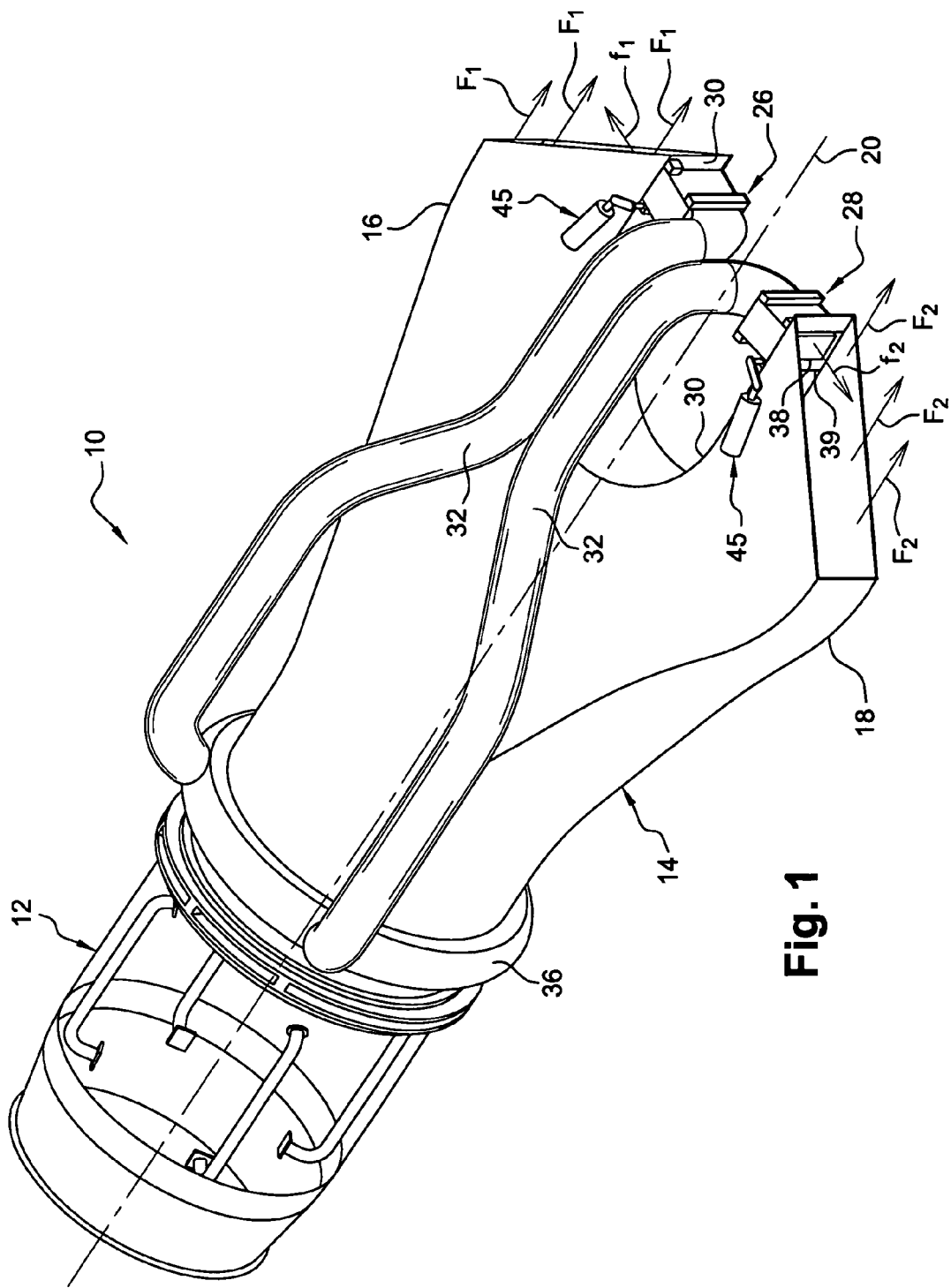
FIG. 1 is a schematic perspective view of an engine of a flying craft equipped with a nozzle according to the invention, viewed from the downstream direction.

FIG. 1 shows an engine of a drone-type flying craft 10, comprising an outer cylindrical casing 12 and a nozzle 14 mounted at the downstream end of the casing 12 for expelling the combustion gases coming from the engine.

The nozzle 14 is a "bifurcated" nozzle and comprises a tubular body with two outlet ducts 16, 18, and also thrust vectoring means for controlling the flying craft in yaw.

The body of the nozzle 14 defines, in the upstream direction, a primary gas flow path of circular cross section which is divided, in the downstream direction, into two secondary gas flow paths of substantially rectangular cross section.

The outlet ducts 16, 18 extend parallel to and at a distance from one another on each side of the longitudinal axis 20 of the engine and of the nozzle. The gas streams which flow into the outlet ducts 16, 18 are represented by the arrows $F_1$ and $F_2$, respectively.

The thrust is vectored by injecting gas in a given direction into an outlet duct 16 or 18 and by deflecting the gas stream $F_1$ or $F_2$ outwardly with respect to the axis of the engine 20.

Each outlet duct 16, 18 is equipped with an injection box 26, 28 attached, in the vicinity of the downstream end of the outlet duct, to a lateral wall 30 of this duct and in an intermediate space situated between the downstream sections of the outlet ducts. These lateral walls 30 are parallel to one another and to the axis 20 of the engine in their downstream sections and merge upstream along the axis 20.

Each box 26, 28 is supplied with gas via a pipe 32 extending along the nozzle 14 between a downstream end which is attached by means of bolts 34 to a wall of the box and which opens outwardly with respect to the axis 20 of the engine, perpendicularly to this axis, and an upstream end connected to an annular manifold 36 installed around the confluence of the engine for bleeding off pressurized gas.

The wall 37 of the box 26, 28, which wall is applied and attached to the wall 30 of the outlet duct by suitable means, has a window 38 which is aligned with a slot 39 of corresponding shape formed in the wall 30 of the outlet duct, for injecting gas from the box in an outward direction with respect to the axis 20 of the engine.

In FIG. 1, the arrow $f_1$ represents the direction in which gas is injected through the window of the box 26 into the outlet duct 16, and the arrow $f_2$ represents the direction in which gas is injected through the window of the box 28 into the outlet duct 18.

Figure 3:
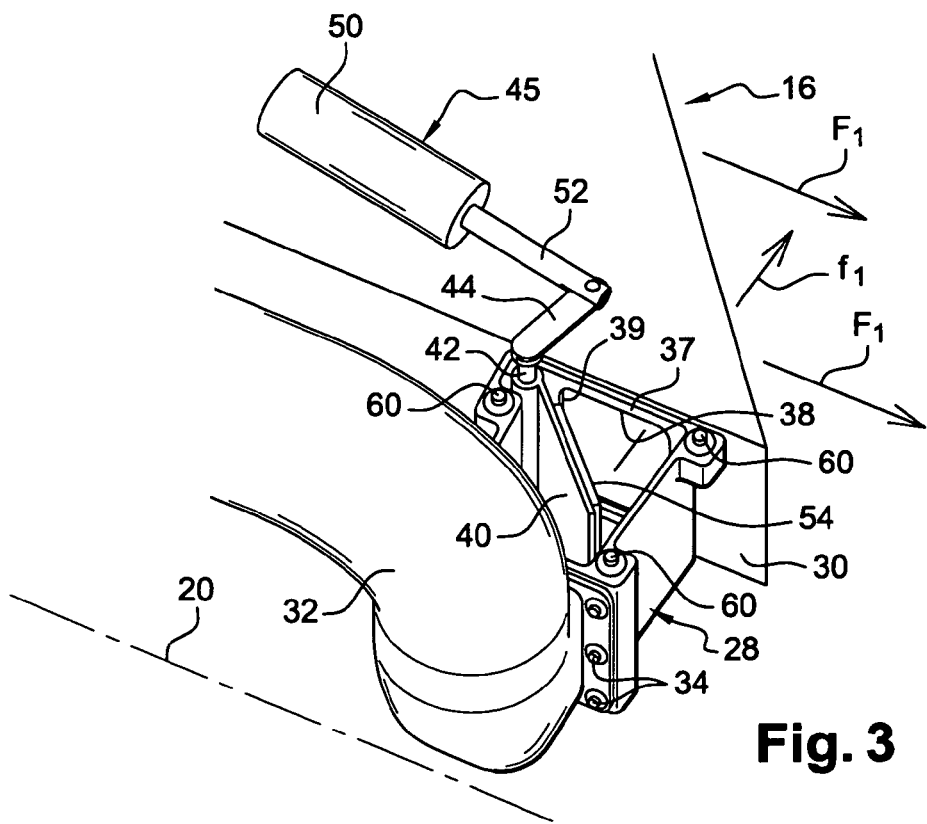
FIG. 3 is a view corresponding to FIG. 2 with partial cutaway of the box, and represents controlled means for adjusting the outflow of gas injected into the secondary path.
Figure 4:
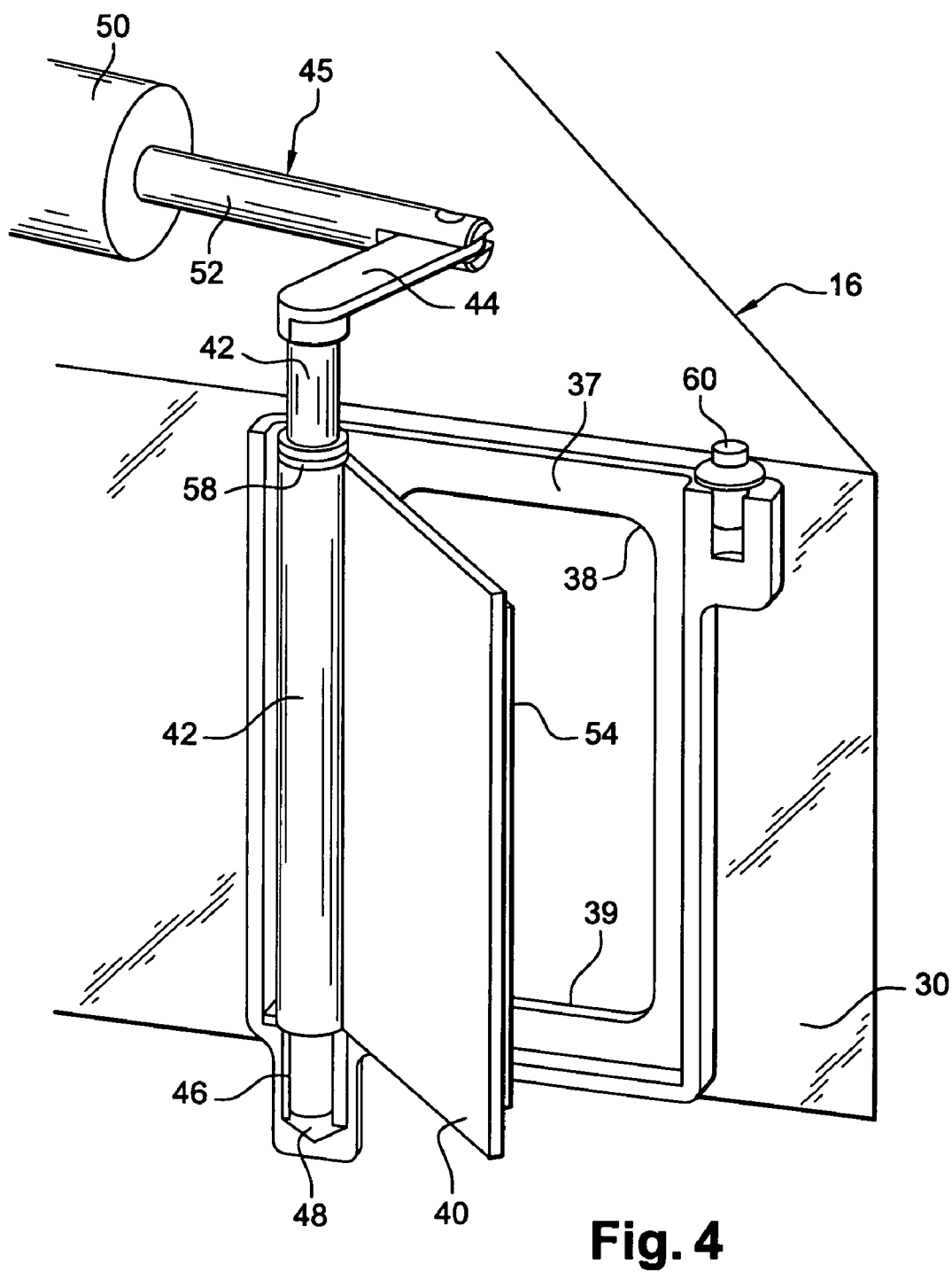
FIG. 4 is a schematic perspective view on an enlarged scale of these controlled adjusting means.

The controlled means for adjusting the outflow of injected gas comprise a flap 40 pivotally mounted inside the box between a position in which it opens the window 38 and a position in which it closes off this window (FIGS. 3 and 4).

An upstream edge of the flap 40 is rigidly fixed to a pin 42 extending along one edge of the window, perpendicularly to the axis of the engine 20 and to the gas stream $f_1$ (FIG. 3), and comprising one end outside the box that is connected by a link 44 to actuating means 45 for pivoting the flap, the other end of which pin is guided in a bearing 46 mounted in a blind hole 48 of the box.

In the example represented, the actuating means comprise a ram 45 whose cylinder 50 is attached to the external wall of the nozzle 14 and whose piston rod 52 is articulated on one end of the link 44.

Figure 2:
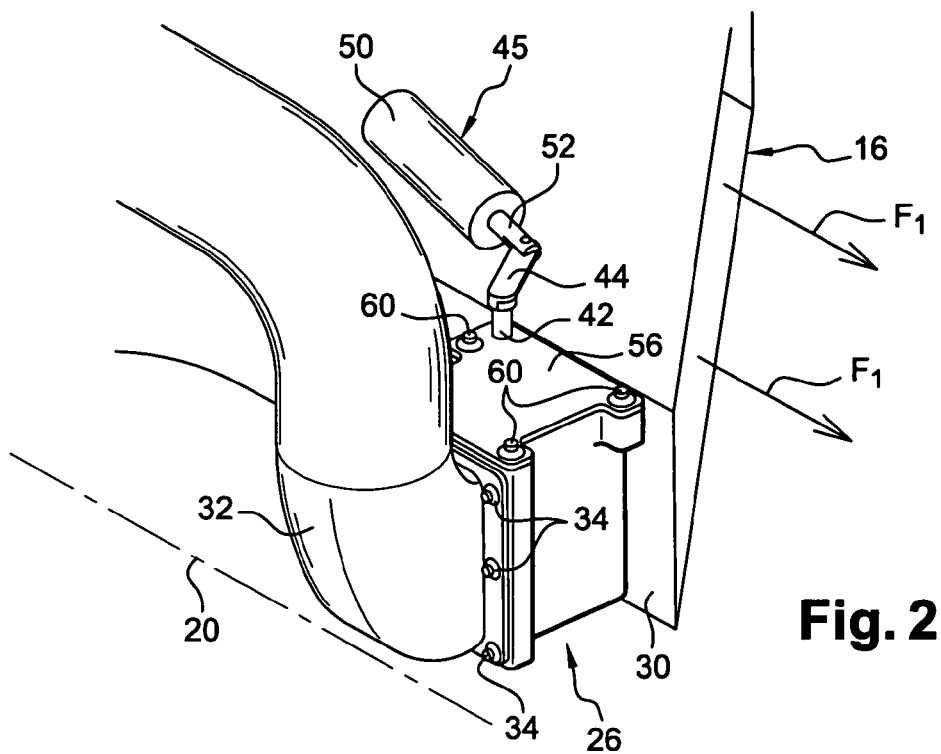
FIG. 2 is an enlarged partial view of FIG. 1 and represents a box for injecting gas into a secondary path of the nozzle.

FIGS. 2 and 3 represent positions in which the window 38 is open, in which positions the flap is inclined at 45° approximately with respect to the axis of the engine 20.

The peripheral edge of the flap 40 is intended to bear against the wall 37 of the box having the window 38 when the latter is in the closed-off position, and the central section of the flap forms a thickened area 54 which fits into the window 38 to provide the continuity of the inner surface of the outlet duct (FIG. 4).

Seals are mounted around the window 38, between the wall 37 of the box and the wall 30 of the outlet duct, and the end of the pin 42 connected to one end of the link 44 passes through a cover 56 of the box in a sealed manner by virtue of an annular seal 58 being mounted in the orifice of the box cover. The cover 56 is attached to the box by means of bolts 60.

The gas streams $f_1$, $f_2$ can be injected into the outlet ducts 16, 18 in a direction perpendicular to the gas streams $F_1$, $F_2$, as represented in FIGS. 1 and 3, or in an oblique direction.

In operation, the flaps 40 of the two boxes are maintained in their position closing off the windows 38 when the flying craft is moving along a rectilinear path. One of the flaps 40 is brought into an open position in order to deflect the flying craft to one side from its rectilinear path, the degree to which the flap is opened adjusting the outflow of gas injected into the corresponding outlet duct, and therefore the deflection of the flying craft.

Opening the flap of the box which is attached to the left-hand outlet duct controls deflection to the left and opening the flap of the box which is attached to the right-hand outlet duct controls deflection to the right.

We claim:

1. An exhaust nozzle for an engine of a flying craft, comprising:
a tubular body with two outlet ducts defining, in the upstream direction, a primary gas flow path divided, in the downstream direction, into two parallel secondary gas flow paths, wherein each of the two outlet ducts comprises a box for injecting gas into a corresponding secondary path, each box being attached to a lateral wall of a corresponding outlet duct in an intermediate space formed between downstream sections of the outlet ducts and each box having a window aligned with a slot formed in the lateral wall of the corresponding outlet duct, and an adjustment mechanism configured to adjust a direction of an outflow of gas injected through said window into the secondary path, wherein said adjustment mechanism is configured to adjust the direction of said outflow of gas between a direction perpendicular to said secondary path and a non-perpendicular direction oblique relative to said secondary path.

2. A nozzle according to claim 1, wherein said adjustment mechanism comprises a flap pivotally mounted inside the box between a position in which the flap closes off the window and a position in which the flap opens the window, said flap being connected to an actuator situated outside the box.

3. A nozzle according to claim 2, wherein the flap is pivotally mounted along an edge of the window by a pin having one end outside the box connected to the actuator and another end guided in a bearing mounted in the box.

4. A nozzle according to claim 2, wherein, when the window is in the closed-off position, the flap provides a continuity of the inner surface of the outlet duct.

5. A nozzle according to claim 3, wherein seals are mounted around the window between the box and the wall of the outlet duct and on the pivot pin of the flap.

6. A nozzle according to claim 1, wherein each box is situated in a vicinity of the downstream end of the outlet duct.

7. A nozzle according to claim 1, wherein the boxes for injecting gas into the outlet ducts are each supplied with pressurized gas via a pipe opening into the box in a direction substantially perpendicular to the axis of the engine and to the yaw axis of the flying craft and directed outwardly with respect to the axis of the engine.

8. A nozzle according to claim 7, wherein, in each outlet duct, the injection of gas from the box is directed outwardly with respect to the axis of the engine.

9. A nozzle according to claim 1, wherein the boxes are supplied with pressurized gas from an annular manifold that bleeds off said pressurized gas flow path.

10. A nozzle according to claim 1, wherein said primary gas flow path has a circular cross section and each of said secondary gas flow paths has a substantially rectangular cross section.

11. A nozzle according to claim 1, wherein each of said outlet ducts has only one sole box.

12. A nozzle according to claim 11, wherein, in each outlet duct, the sole box is located on an inner lateral wall of the outlet duct relative to an axis of the engine.

* * * * *

UNITED STATES PATENT AND TRADEMARK OFFICE
CERTIFICATE OF CORRECTION

| | | |
|---|---|---|
| PATENT NO. | : 7,533,517 B2 | Page 1 of 1 |
| APPLICATION NO. | : 11/402952 | |
| DATED | : May 19, 2009 | |
| INVENTOR(S) | : Bruno Albert Beutin et al. | |

It is certified that error appears in the above-identified patent and that said Letters Patent is hereby corrected as shown below:

Column 4, line 49, after "gas" insert --from said primary gas--.

Signed and Sealed this

Eighth Day of September, 2009

David J. Kappos
*Director of the United States Patent and Trademark Office*